US012574182B2

(12) United States Patent (10) Patent No.: US 12,574,182 B2
Luo et al. (45) Date of Patent: Mar. 10, 2026

---

(54) METHOD PERFORMED BY USER EQUIPMENT, AND USER EQUIPMENT

(71) Applicant: SHARP KABUSHIKI KAISHA, Sakai City (JP)

(72) Inventors: Chao Luo, Shanghai (CN); Renmao Liu, Shanghai (CN); Yinan Zhao, Shanghai (CN)

(73) Assignee: SHARP KABUSHIKI KAISHA, Sakai City (JP)

( * ) Notice: Subject to any disclaimer, the term of this patent is extended or adjusted under 35 U.S.C. 154(b) by 360 days.

(21) Appl. No.: 17/627,308

(22) PCT Filed: Jul. 16, 2020

(86) PCT No.: PCT/CN2020/102437
§ 371 (c)(1),
(2) Date: Jan. 14, 2022

(87) PCT Pub. No.: WO2021/008587
PCT Pub. Date: Jan. 21, 2021

(65) Prior Publication Data
US 2022/0247539 A1 Aug. 4, 2022

(30) Foreign Application Priority Data

Jul. 17, 2019 (CN) .......................... 201910648773.3

(51) Int. Cl.
*H04W 72/12* (2023.01)
*H04L 1/1812* (2023.01)
(Continued)

(52) U.S. Cl.
CPC .......... *H04L 5/0053* (2013.01); *H04L 1/1812* (2013.01); *H04W 72/1263* (2013.01); *H04W 72/20* (2023.01); *H04W 92/18* (2013.01)

(58) Field of Classification Search
CPC ......... H04W 4/40; H04W 4/46; H04W 28/08; H04W 28/0875; H04W 76/23
See application file for complete search history.

(56) References Cited

U.S. PATENT DOCUMENTS

| 2019/0044667 A1 | 2/2019 | Guo et al. |
| 2019/0052436 A1 | 2/2019 | Desai et al. |
| (Continued) | | |

FOREIGN PATENT DOCUMENTS

| CN | 101924618 A | 12/2010 |
| CN | 109792594 A | 5/2019 |

OTHER PUBLICATIONS

LG Electronics et al., "New WID on 5G V2X with NR sidelink", RP-190766, 3GPP TSG RAN Meeting #83, Shenzhen, China, Mar. 18-21, 2019.
(Continued)

*Primary Examiner* — Bo Hui A Zhu
(74) *Attorney, Agent, or Firm* — ScienBiziP, P.C.

(57) ABSTRACT

According to the present invention, a method performed by user equipment is provided, the method is characterized by comprising: receiving a physical sidelink control channel (PSCCH) comprising sidelink control information (SCI) used to schedule transmission of a physical sidelink shared channel (PSSCH) carrying a transport block (TB); determining hybrid automatic repeat request (HARQ) information associated with the TB; and reporting the HARQ information from a physical layer to a medium access control (MAC) sublayer.

4 Claims, 2 Drawing Sheets

(51) Int. Cl.
     _H04L 5/00_      (2006.01)
     _H04W 72/1263_   (2023.01)
     _H04W 72/20_     (2023.01)
     _H04W 92/18_         (2009.01)

(56)               References Cited

U.S. PATENT DOCUMENTS

| | | | |
|---|---|---|---|
| 2021/0126744 A1* | 4/2021 | Hwang ................. | H04L 1/1819 |
| 2021/0321380 A1 | 10/2021 | Zhao | |
| 2022/0006571 A1* | 1/2022 | Basu Mallick ....... | H04L 5/0055 |
| 2022/0039149 A1* | 2/2022 | Chen .................... | H04W 72/12 |
| 2022/0201654 A1* | 6/2022 | Lee ....................... | H04L 1/1864 |

OTHER PUBLICATIONS

Vodafone, "New SID: Study on NR V2X", RP-181429, 3GPP TSG
RAN Meeting #80, La Jolla, USA, Jun. 11-14, 2018.
NTT DOCOMO, Inc., "Revised WID on New Radio Access Tech-
nology", RP-181474, 3GPP TSG RAN Meeting #80, La Jolla, USA,
Jun. 11-14, 2018.
Huawei et al., "Discussion on HARQ support for NR sidelink",
R2-1907414, 3GPP TSG-RAN WG2 #106, Reno, USA, May 13-17,
2019, May 2, 2019.

* cited by examiner

UE40

Processor 401

Memory 402

METHOD PERFORMED BY USER EQUIPMENT, AND USER EQUIPMENT

TECHNICAL FIELD

The present invention relates to a method performed by user equipment, and user equipment.

BACKGROUND

In LTE and 5G NR Rel-15 (see Non-Patent Document 1, hereinafter referred to as 5G Rel-15, or NR Rel-15) systems, downlink assignment and uplink grant respectively comprise HARQ information related to data to be received and to be transmitted.

In the LTE system, for a downlink shared channel (DL-SCH), the HARQ information includes a new data indicator (NDI), a transport block size (TBS), and a HARQ process identifier (HARQ process ID); for an uplink shared channel (UL-SCH), the HARQ information includes an NDI, a TBS, a HARQ process identifier (e.g., in an asynchronous uplink HARQ), and a redundancy version (RV). In LTE-based LTE V2X, since HARQ feedback is not supported in a MAC sublayer and a physical layer, for a sidelink shared channel (SL-SCH), only a TBS is included in the HARQ information.

In the 5G Rel-15 system, for a DL-SCH and a UL-SCH, the HARQ information includes an NM, a TBS, an RV, and a HARQ process identifier.

The present invention is intended to resolve the problem of how to define HARQ information and HARQ information-related operations in the case where a physical layer of UE supports blind retransmission and/or HARQ retransmission and/or multiple source/destination IDs and/or multiple cast-types.

PRIOR ART DOCUMENTS

Non-Patent Documents

Non-Patent Document 1: RP-181474, Revised WID on New Radio Access Technology
Non-Patent Document 2: RP-181429, New SID: Study on 5G V2X
Non-Patent Document 3: RP-190766, New WID on 5G V2x with NR sidelink

SUMMARY OF INVENTION

In order to solve at least part of the aforementioned problem, provided in the present invention are a method performed by user equipment, and user equipment. By appropriately defining HARQ information, a MAC sublayer of the UE can accurately acquire complete information of a TB related to HARQ procedure, so as to correctly perform operation(s) related to HARQ, and ensure that a plurality of transmissions of one TB can be effectively combined in the case where a physical layer of the UE supports blind retransmission and/or HARQ retransmission, ensuring the performance of HARQ combining.

According to the present invention, a method performed by user equipment is provided, and the method is characterized by comprising: receiving a physical sidelink control channel (PSCCH) comprising sidelink control information (SCI) used to schedule transmission of a physical sidelink shared channel (PSSCH) carrying a transport block (TB); determining hybrid automatic repeat request (HARQ) information associated with the TB; and reporting the HARQ information from a physical layer to a medium access control (MAC) sublayer.

Preferably, the HARQ information comprises one or a plurality of the following: a cast-type, a layer-1 source identifier, a layer-1 destination identifier, a HARQ process identifier, a new data indicator, a redundancy version, a session identifier, a transport block size, a transmitting/receiving party distance, a communication range requirement, information indicating whether the communication range requirement is met, information indicating whether HARQ feedback is required, and a HARQ feedback type.

Preferably, the cast-type comprises: any one of unicast and groupcast, any one of unicast and broadcast, any one of groupcast and broadcast, or any one of unicast, groupcast, and broadcast.

Preferably, the method further comprises: reporting the SCI and/or the TB while reporting the HARQ information.

Furthermore, according to the present invention, a method performed by user equipment is provided, the method is characterized by comprising: at a medium access control (MAC) sublayer, receiving, from a physical layer, hybrid automatic repeat request (HARQ) information associated with a transport block (TB); and allocating the TB and/or the HARQ information to a sidelink HARQ process.

Preferably, the sidelink HARQ process to be allocated to is determined according to one or a plurality of the following comprised in the HARQ information: a cast-type, a layer-1 source identifier, a layer-1 destination identifier, a HARQ process identifier, a new data indicator, a redundancy version, a session identifier, a transport block size, a transmitting/receiving party distance, a communication range requirement, information indicating whether the communication range requirement is met, information indicating whether HARQ feedback is required, and a HARQ feedback type.

Furthermore, according to the present invention, a method performed by user equipment is provided, the method is characterized by comprising: at a medium access control (MAC) sublayer, receiving, from a physical layer, hybrid automatic repeat request (HARQ) information associated with a transport block (TB); and determining whether to instruct the physical layer to generate an acknowledgement to data in the TB.

Preferably, if a no-acknowledgement condition is met, the physical layer is not instructed to generate the acknowledgement to the data in the TB; if the no-acknowledgement condition is not met, the physical layer is instructed to generate the acknowledgement to the data in the TB, wherein the no-acknowledgement condition comprises one or a plurality of the following: a cast-type in the HARQ information is broadcast, the value of "whether HARQ feedback is required" in the HARQ information is "no", and a "HARQ feedback type" in the HARQ information is "none".

Preferably, the HARQ information comprises one or a plurality of the following: a cast-type, a layer-1 source identifier, a Layer-1 destination identifier, a HARQ process identifier, a new data indicator, a redundancy version, a session identifier, a transport block size, a transmitting/receiving party distance, a communication range requirement, information indicating whether the communication range requirement is met, information indicating whether HARQ feedback is required, and a HARQ feedback type.

Additionally, according to the present invention, proposed is user equipment, including: a processor; and a memory storing instructions, wherein the instructions; when run by the processor, perform the above method.

According to the present invention, by appropriately defining HARQ information, a MAC sublayer of the UE can accurately acquire complete information of a TB related to HARQ procedure, so as to correctly perform operation(s) related to HARQ, and ensure that a plurality of transmissions of one TB can be effectively combined in the case where a physical layer of the UE supports blind retransmission and/or HARQ retransmission, ensuring the performance of HARQ combining. In addition, according to a cast-type and other information related to HARQ acknowledgement in the HARQ information, it is determined whether to instruct the physical layer to generate an acknowledgement to the received TB, ensuring that the HARQ procedure of the UE supports both HARQ feedback-based transmission and HARQ feedback-free transmission.

BRIEF DESCRIPTION OF THE DRAWINGS

The above and other features of the present invention will be more apparent from the following detailed description in combination with the accompanying drawings, in which.

DETAILED DESCRIPTION

Figure 1:
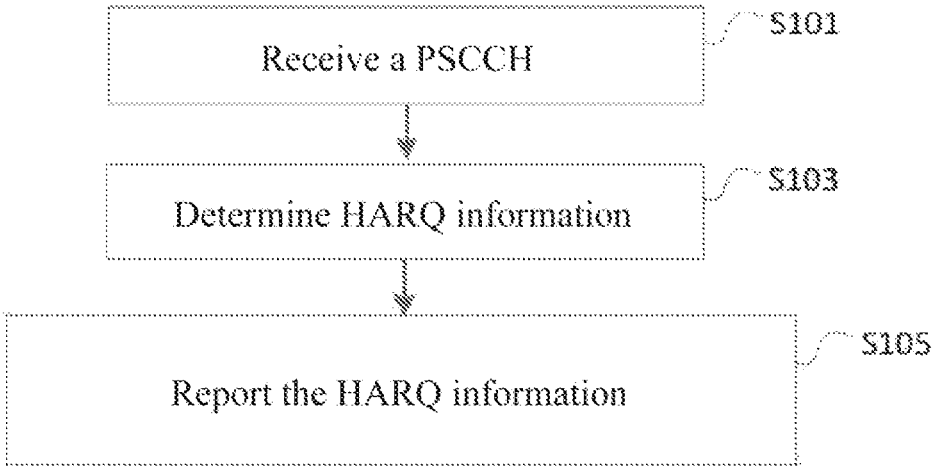
FIG. 1 is a flowchart showing a method performed by user equipment according to Embodiment 1 of the present invention.

The following describes the present invention in detail with reference to the accompanying drawings and specific embodiments. It should be noted that the present invention should not be limited to the specific embodiments described below. In addition, detailed descriptions of well-known technologies not directly related to the present invention are omitted for the sake of brevity, in order to avoid obscuring the understanding of the present invention.

In the following description, a 5G mobile communication system and its later evolved versions are used as exemplary application environments to set forth a plurality, of embodiments according to the present invention in detail. However, it is to be noted that the present invention is not limited to the following implementations, but is applicable to many other wireless communication systems, such as a communication system after 5G and a 4G mobile communication system before 5G.

Some terms involved in the present invention are described below. Unless otherwise specified, the terms used in the present invention adopt the definitions herein. The terms given in the present invention may vary in LTE, LTE-Advanced, LTE-Advanced Pro, NR, and subsequent communication systems, but unified terms are used in the present invention. When applied to a specific system, the terms may be replaced with terms used in the corresponding system.

3GPP: 3rd Generation Partnership Project
ACK: Acknowledgement
AS: Access Stratum
BWP: Bandwidth Part CA: Carrier Aggregation
CCE: Control Channel Element
CORESET: Control Resource Set
CP: Cyclic Prefix
CP-OFDM: Cyclic Prefix Orthogonal Frequency Division Multiplexing
CRB: Common Resource Block
CRC: Cyclic Redundancy Check
CSI: Channel-State Information
CSS: Common Search Space
DC: Dual Connectivity
DCI: Downlink Control Information
DFN: Direct Frame Number
DFT-s-OFDM: Discrete Fourier Transformation Spread Orthogonal Frequency Division Multiplexing
DL: Downlink
DL-SCH: Downlink Shared Channel
DM-RS: Demodulation Reference Signal
eMBB: Enhanced Mobile Broadband, enhanced mobile broadband communication
eNB: E-UTRAN Node B
E-UTRAN: Evolved UMTS Terrestrial Radio Access Network
FDRA: Frequency Domain Resource Assignment
FR1: Frequency Range 1
FR2: Frequency Range 2
GLONASS: Global Navigation Satellite System
gNB: NR Node B
GNSS: Global Navigation Satellite System
GPS: Global Positioning System
HARQ: Hybrid Automatic Repeat Request
ID: Identity (or Identifier)
IE: Information Element
IP: Internet Protocol
LCID: Logical Channel ID, Logical Channel Identifier
LTE: Long Term Evolution
LTE-A: Long Term Evolution-Advanced
MAC: Medium Access Control
MAC CE: MAC Control Element
MCG: Master Cell Group
MIB: Master Information Block
MIB-SL: Master Information Block-Sidelink
MIB-SL-V2X: Master Information Block-Sidelink-V2X
MIB-V2X: Master Information Block-V2X
mMTC: Massive Machine Type Communication
NACK: Negative Acknowledgement
NAK: Negative Acknowledgement
NAS: Non-Access Stratum
NDI: New Data. Indicator
NR: New Radio
NUL: Normal Uplink
OFDM: Orthogonal Frequency Division Multiplexing
PBCH: Physical Broadcast Channel
PDCCH: Physical Downlink Control Channel
PDCP: Packet Data Convergence Protocol.
PDSCH: Physical Downlink Shared Channel
PSBCH: Physical Sidelink Broadcast Channel
PSCCH: Physical Sidelink Control Channel
PSFCH: Physical Sidelink Feedback Channel
PSSCH: Physical Sidelink Shared Channel
PRB: Physical Resource Block
PSS: Primary Synchronization Signal
PSSS: Primary Sidelink Synchronization Signal
PTAG: Primary Timing Advance Group
PUSCH: Physical Uplink Shared Channel
PUCCH: Physical Uplink Control Channel
QCL: Quasi Co-Location QoS: Quality of Service QZSS: Quasi-Zenith Satellite System RAR: Random Access Response RB: Resource Block RE: Resource Element REG: Resource-Element Group RF: Radio Frequency RLC: Radio Link Control RNTI: Radio Network Temporary Identifier RRC: Radio Resource Control RV: Redundancy Version S-BWP: Sidelink Bandwidth Part S-MIB: Sidelink Master information Block S-PSS: Sidelink Primary Synchronization Signal S-SSB: Sidelink SS/PBCH Block (Sidelink Synchronization Signal/Physical Broadcast Channel Block)

S-SSS: Sidelink Secondary Synchronization Signal

SCG: Secondary Cell Group

SCI: Sidelink Control Information

SCS: Subcarrier Spacing

SDAP: Service Data. Adaptation Protocol

SFN: System Frame Number

SIB: System Information Block

SL: Sidelink

SL BWP: Sidelink Bandwidth Part

SL MIB: Sidelink Master Information Block

SL PSS: Sidelink Primary Synchronization Signal

SL SS: Sidelink Synchronization Signal

SL SSID: Sidelink Synchronization Signal Identity (or Sidelink Synchronization Signal Identifier)

SL SSB: Sidelink SS/PBCH Block (Sidelink Synchronization Signal/Physical Broadcast Channel Block)

SL SSS: Sidelink Secondary Synchronization Signal

SLSS: Sidelink Synchronization Signal

SLSS ID: Sidelink Synchronization Signal Identity (or Sidelink Synchronization Signal Identifier)

SLSSID: Sidelink Synchronization Signal Identity (or Sidelink Synchronization Signal identifier)

SpCell: Special Cell

SRS: Sounding Reference Signal

SSB: SS/PBCH Block (Synchronization Signal/Physical Broadcast Channel Block)

SSS: Secondary Synchronization Signal

SSSS: Secondary Sidelink Synchronization Signal

STAG: Secondary Timing Advance Group

SUL: Supplementary Uplink

TA: Timing Advance

TAG: Timing Advance Group

TB: Transport Block

TCP: Transmission Control Protocol

TDD: Time Division Duplexing

TPC: Transmit Power Control

UE: User Equipment

UL: Uplink

UMTS: Universal Mobile Telecommunications System

URLLC: Ultra-Reliable and Low Latency Communication

USS: UE-specific Search Space

V2I: Vehicle-to-Infrastructure

V2N: Vehicle-to-Network

V2P: Vehicle-to-Pedestrian

V2V: Vehicle-to-Vehicle

V2X: Vehicle-to-Everything

Unless otherwise specified, in all embodiments and implementations of the present invention, An SL MIB (Sidelink Master Information Block) may also be referred to as an S-MIB, or an MIB-SL. Optionally, when used for V2X services, the SL MIB refers to an MIB-SL-V2X.

Embodiment 1

A method performed by user equipment according to Embodiment 1 of the present invention will be described below with reference to FIG. 1.

FIG. 1 is a flowchart showing a method performed by user equipment according to Embodiment 1 of the present invention.

As shown in FIG. 1, in Embodiment 1 of the present invention, steps performed by the user equipment (UE) include: step S101, step S103, and step S105. Optionally, one or a plurality of step S101, step S103, and step S105 may be omitted (when applicable).

Specifically, in step S101, a PSCCH (physical sidelink control channel) is received. wherein:

Optionally, the "receiving the PSCCH" includes: detecting (for example, attempting to decode) the PSCCH on one or a plurality of PSCCH resources. wherein:

Optionally, the PSCCH resource may also be referred to as a PSCCH candidate or a PSCCH candidate resource.

Optionally, the PSCCH resource may be defined in the time-domain and/or the frequency-domain and/or the code-domain. For example, one PSCCH resource is embodied as one or a plurality of OFDM symbols in the time domain. In another example, one PSCCH resource is embodied in the frequency domain as one or a plurality of RBs (resource blocks), or one or a plurality of RBGs (resource block groups), or one or a plurality of subchannels. In another example, one PSCCH resource is embodied as a scrambling code sequence in the code domain.

Optionally, the one or plurality of PSCCH resources may be determined according to predefined information.

Optionally, the one or plurality of PSCCH resources may be determined according to configuration information or pre-configuration information.

Optionally, the "receiving the PSCCH" includes: receiving SCI (sidelink control information) carried in the PSCCH. wherein:

Optionally, the "receiving the SCI carried in the PSCCH" includes: detecting (for example, attempting to decode) the PSCCH according to one or a plurality of SCI formats. wherein:

Optionally, the one or plurality of SCI formats may be determined according to predefined information.

Optionally, the one or plurality of SCI formats may be determined according to configuration information or pre-configuration information.

Optionally, the SCI may be divided into two parts, or called two stages, for example, referred to as a first-stage SCI and a second-stage SCI, respectively. wherein:

Optionally, the first-stage SCI and the second-stage SCI may correspond to the same SCI format, or may correspond to different SCI formats (for example, correspond to a first SCI format and a second SCI format, respectively).

Optionally, the first-stage SCI and the second-stage SCI may be carried in the same PSCCH, or may be carried in different PSCCHs (for example, carried in a first PSCCH and a second PSCCH, respectively), wherein:

Optionally, a transmission parameter (for example, a DMRS sequence of the first PSCCH) and/or the first-stage SCI of the first PSCCH may indicate information related to the second PSCCH and/or the second-stage SCI, for example, resource allocation information such as time and/or frequency and/or scrambling code of the second PSCCH, in another example, the second SCI format.

Optionally, the SCI may schedule a PSSCH (physical sidelink shared channel) transmission.

Optionally, sometimes this is also referred to as the PSCCH scheduling the PSSCH transmission.

Optionally, the PSSCH transmission corresponds to a transmission on an SL-SCH (sidelink shared channel). Optionally, the transmission on the SL-SCH corresponds to a specific MAC entity.

Optionally, the PSSCH carries a TB (transport block).

Optionally, the "receiving the PSCCH" may also be replaced with any one of the following:

receiving SCI;

receiving SCI carried in the PSCCH; and receiving the PSCCH and the SCI carried therein.

In addition, in step S103, HARQ information is determined.

wherein:

Optionally, the information may be HARQ information associated with the TB.

Optionally, the HARQ information may be HARQ information associated with the SCI.

Optionally, the HARQ information may be HARQ information associated with the PSSCH.

Optionally, the HARQ information may be HARQ information associated with the PSCCH.

Optionally, part or all of the HARQ information is provided (or indicated) by one or a plurality of the following:

The SCI. wherein:

Optionally, the SCI indicates whether the TB exists. In addition, if the TB exists, the SCI further provides part or all of the related HARQ information (for example, part or all of the HARQ information associated with the TB). Optionally, "the TB" may also be replaced with "a transmission on an SL-SCH for a specific MAC entity".

Optionally, the SCI not only indicates that the TB exists, but also provides part or all of the related HARQ information (for example, part or all of the HARQ information associated with the TB). Optionally, "the TB" may also be replaced with "a transmission on an SL-SCH for a specific MAC entity".

A transmission parameter of the PSCCH (for example, a DMRS sequence of the PSCCH).

A transmission parameter of the PSSCH (for example, a DMRS sequence of the PSSCH).

A time-domain and/or frequency-domain and/or code-domain resource occupied by the PSCCH.

A time-domain and/or frequency-domain and/or code-domain resource occupied by the PSSCH.

A time-domain and/or frequency-domain and/or code-domain resource occupied by the PSCCH and the PSSCH together.

A resource pool to which the PSCCH belongs.

A resource pool to which the PSSCH belongs.

A resource pool to which the PSCCH and the PSSCH together belong.

An RNTI used to scramble a CRC of the PSCCH.

An RNTI and/or an ID used to scramble the PSSCH (for example, a codeword formed by the TB carried by the PSSCH after channel encoding).

Optionally, the HARQ information may comprise one or a plurality of the following:

A cast-type (or casting-type). wherein:

Optionally, the value of the cast-type may be a value in a set {unicast, groupcast}, or may be a value in a set {unicast, broadcast}, or may be a value in a set {groupcast, broadcast}, or may be a value in a set {unicast, groupcast/broadcast}, or may be a value in a set {groupcast, unicast/broadcast}, or may be a value in a set {broadcast, unicast/groupcast}, or may be a value in a set {unicast, groupcast, broadcast}. The "groupcast/broadcast" indicates groupcast or broadcast, "unicast/broadcast" indicates unicast or broadcast, and "unicast/groupcast" indicates unicast or groupcast.

Optionally, if the RNTI used to scramble the CRC of the PSCCH is a UNICAST_RNTI, the cast-type is unicast. wherein:

Optionally, the UNICAST_RNTI may be a predefined value, or may be a configured value, or may be a pre-configured value.

Optionally, if the RNTI used to scramble the CRC of the PSCCH is a GROUPCAST_RNTI, the cast-type is groupcast. wherein:

Optionally, the GROUPCAST_RNTI may be a predefined value, or may be a configured value, or may be a preconfigured value.

Optionally, if the RNTI used to scramble the CRC of the PSCCH is a BROADCAST_RNTI, the cast-type is broadcast. wherein:

Optionally, the BROADCAST_RNTI may be a predefined value, or may be a configured value, or may be a preconfigured value.

Optionally, the cast-type may be the cast-type of the PSCCH.

Optionally, the cast-type may be the cast-type of the SCI.

Optionally, the cast-type may be the cast-type of the PSSCH,

Optionally, the cast-type may be the cast-type of the TB.

Optionally, the cast-type is determined by or with the assistance of the format of the SCI. For example, if the format of the SCI is a predefined or configured or pre-configured "broadcast SCI format", the cast-type is broadcast. In another example, if the format of the SCI is a predefined or configured or pre-configured "SCI format with HARQ feedback", the cast-type is unicast or groupcast.

Optionally, the cast-type may be indicated in the SCI. For example, part or all of bits of a field in the SCI are used to indicate the cast-type.

A layer-1 source identifier (layer-1 source ID). wherein:

Optionally, the layer-1 source identifier may be an 8-bit integer, or a 10-bit integer, or a 12-bit integer, or a 14-bit integer, or a 16-bit integer, or an 18-bit integer, or a 20-bit integer, or a 22-bit integer, or a 24-bit integer, or a 26-bit integer, or a 28-bit integer, or a 30-bit integer, or a 32-bit integer.

Optionally, the layer-1 source identifier may be used to identify, at a physical layer, UE that transmits the PSCCH and/or the PSSCH and/or the SCI and/or the TB.

Optionally, the layer-1 source identifier may be indicated in the SCI. For example, part or all of bits of a field in the SCI are used to indicate the layer-1 source identifier.

A layer-1 destination identifier (layer-1 destination ID). wherein:

Optionally, the layer-1 destination identifier may be an 8-bit integer, or a 10-bit integer, or a 12-bit integer, or a 14-bit integer, or a 16-bit integer, or an 18-bit integer, or a 20-bit integer, or a 22-bit integer, or a 24-bit integer, or a 26-bit integer, or a 28-bit integer, or a 30-bit integer, or a 32-bit integer.

Optionally, if the cast-type is unicast, the layer-1 destination identifier may be used to identify, at the physical layer, destination UE of the PSCCH and/or the PSSCH and/or the SCI and/or the TB, Optionally, if the cast-type is groupcast, the layer-1 destination identifier may be used to identify, at the physical layer, a destination UE group of the PSCCH and/or the PSCCH and/or the SCI and/or the TB. Optionally, the destination UE group may include one or a plurality of UEs.

Optionally, if the cast-type is broadcast, the layer-1 destination identifier may be set to a predefined or configured or pre-configured value. In this case, optionally, the layer-1 destination identifier may be used to identify, at the physical layer, all UEs, for example, all 5G UEs, or all V2X UEs, or all 5G V2X UEs.

Optionally, if the cast-type is broadcast, the layer-1 destination identifier does not exist.

Optionally, the layer-1 destination identifier may be indicated in the SCI. For example, part or all of bits of a field in the SCI are used to indicate the layer-1 destination identifier.

A HARQ process identifier (HARQ process ID). wherein:

Optionally, the HARQ process identifier may be a 1-bit integer, or a 2-bit integer, or a 3-bit integer, or a 4-bit integer, or a 5-bit integer, or a 6-bit integer.

Optionally, the HARQ process identifier may be used to identify a HARQ process to which the TB belongs.

Optionally, the HARQ process identifier may be indicated in the SCI. For example, part or all of bits of a field in the SCI are used to indicate the HARQ process identifier.

A new data indicator (NDI). wherein:

Optionally, the value of the new data indicator may be a value in a set {0, 1}.

Optionally, the new data indicator may be used to indicate (or to determine, or to assist in determining) whether the TB corresponds to a new transmission or to a retransmission.

Optionally, the new data indicator may be indicated in the SCI. For example, part or all of bits of a field in the SCI are used to indicate the new data indicator.

A redundancy version (RV). wherein:

Optionally, the value of the redundancy version may be a value in a set {0, 1, 2, 3}.

Optionally, the redundancy version may be used to indicate a redundancy version used for a current transmission of the TB.

Optionally, the redundancy version may be indicated in the SCI. For example, part or all of bits of a field in the SCI are used to indicate the redundancy version, A session identifier (session ID). wherein:

Optionally, the session identifier may be used to identify a higher-layer SL session, in example, a higher-layer broadcast session, in another example, a higher-layer groupcast session, for another example, a higher-layer unicast session.

Optionally, the session identifier may be indicated in the SCI. For example, part or all of bits of a field in the SCI are used to indicate the session identifier.

A transport block size (TBS). wherein:

Optionally, the transport block size may be the size of the TB (for example, expressed by the number of bits, or expressed by the number of bytes).

Optionally, the transport block size may be indicated in the SCI, For example, part or all of bits of a field in the SCI are used to indicate the transport block size.

Optionally, the transport block size may be determined in a manner similar to that of determining a transport block size of a PDSCH in an NR downlink, or may also be determined in other manners.

A distance between a transmitting party and a receiving party (TX-RX distance), for example, a geographical distance between a transmitting party and a receiving party. wherein:

Optionally, the "distance between a transmitting party and a receiving party" may be determined according to a zone identifier (zone ID) of the transmitting party and a zone identifier of the receiving party. The zone identifier of the transmitting party may be indicated in the SCI, or may be indicated in a higher-layer message; the zone identifier of the receiving party may be determined by the receiving party according to a GNSS indication or the like.

A communication range requirement. wherein:

Optionally, the "communication range requirement" may be included in predefined information.

Optionally, the "communication range requirement" may be included in configuration information.

Optionally, the "communication range requirement" may be included in pre-configuration information.

Optionally, the "communication range requirement" may be indicated in the SCI. For example, part or all of bits of a field in the SCI are used to indicate the communication range requirement.

Whether the communication range requirement is met. wherein:

Optionally, the value of the "whether the communication range requirement is met" may be a value in a set {yes, no}. "Yes" indicates that the communication range requirement is met, and "no" indicates that the communication range requirement is not met.

Optionally; if the "distance between a transmitting party and a receiving party" is less than the "communication range requirement", the value of the "whether the communication range requirement is met" is "yes"; otherwise, the value of the "whether the communication range requirement is met" is "no".

Optionally, if the "distance between a transmitting party and a receiving party" is less than or equal to the "communication range requirement", the value of the "whether the communication range requirement is met" is "yes"; otherwise, the value of the "whether the communication range requirement is met" is "no".

Whether HARQ feedback is required. wherein:

Optionally, the value of the "whether HARQ feedback is required" may be a value in a set {yes, no}. "Yes" indicates that HARQ feedback is required, and "no" indicates that HARQ feedback is not required.

Optionally, the "whether HARQ feedback is required" may be determined according to one or a plurality of the following (in any combination of "and" or "or" when applicable):

The "whether HARQ feedback is required" may be indicated in the SCI.

The "whether HARQ feedback is required" may be comprised in configuration information. For example, it is determined according to the configuration information that all (or none) of SL transmissions require HARQ feedback. In another example, it is determined according to the configuration information that all (or none) of SL transmissions whose cast-type is unicast require HARQ feedback. In another example, it is determined according to the configuration information that all (or none) of SL transmissions whose cast-type is groupcast require HARQ feedback.

The "whether HARQ feedback is required" may be comprised in pre-configuration information. For example, it is determined according to the pre-configuration information that all (or none) of SL transmissions require HARQ feedback. In another example, it is determined according to the pre-configuration information that all (or none) of SL transmissions whose cast-type is unicast require HARQ feedback. In another example, it is determined according to the pre-configuration information that all (or none) of SL transmissions whose cast-type is groupcast require HARQ feedback.

The value of the "whether HARQ feedback is required" is determined according to the cast-type. For example; if the cast-type is broadcast; HARQ feedback is not required. In another example, if the cast-type is unicast or groupcast, it is determined whether HARQ feedback is required according to another condition or a combination of conditions (for example, according to the "whether HARQ feedback is required" in the configuration information or pre-configuration information, in another example, according to whether the resource pool corresponding to the PSCCH and/or the PSSCH and/or the SCI and/or the TB is configured with a HARQ feedback resource, etc.).

The value of the "whether HARQ feedback is required" is determined according to whether the resource pool corresponding to the PSCCH and/or the PSSCH and/or the SCI and/or the TB is configured with a HARQ feedback resource (such as a PSFCH resource). For example, if the resource pool corresponding to the PSCCH and/or the PSSCH and/or the SCI and/or the TB is configured with the PSFCH resource; HARQ feedback is required; otherwise, HARQ feedback is not required.

The value of the "whether HARQ feedback is required" is determined according to the distance between a transmitting party and a receiving party (for example, geographical distance).

The value of the "whether HARQ feedback is required" is determined according to whether the communication range requirement is met.

The value of the "whether HARQ feedback is required" is determined in other manners.

Optionally, the "whether HARQ feedback is required" may be replaced with a "HARQ feedback indicator". Optionally, the value of the "HARQ feedback indicator" may be a value in a set $\{1, 0\}$. "1" indicates that HARQ feedback is required, and "0" indicates that HARQ feedback is not required.

Optionally, the "whether HARQ feedback is required" may be replaced with "whether HARQ feedback is enabled". Optionally, the value of the "whether HARQ feedback is enabled" may be a value in a set {yes, no}. "Yes" indicates that HARQ feedback is enabled, which corresponds to "HARQ feedback is required"; "no" indicates that HARQ feedback is disabled (or deactivated), which corresponds to "HARQ feedback is not required".

Optionally, the "whether HARQ feedback is required" may be replaced with "whether HARQ feedback is requested". Optionally, the value of the "whether HARQ feedback is requested" may be a value in a set yes, "Yes" indicates that HARQ feedback is requested, which corresponds to "HARQ feedback is required"; "no" indicates that HARQ feedback is not requested, which corresponds to "HARQ feedback is not required".

A HARQ feedback type. wherein:

Optionally, the value of the "HARQ feedback type" may be a value in a set Z={none, ACK, NACK, ACK or NACK}, or a value in any subset of the set Z (such as Z1={ACK, NACK, ACK or NACK}), wherein:

Optionally, the value "none" in the set Z may indicate that no HARQ feedback is transmitted to the TB (regardless of the result of processing the TB).

Optionally, the value "ACK" in the set Z may indicate that HARQ feedback is transmitted only when the result of processing the TB is that an ACK needs to be fed back, otherwise no HARQ feedback is transmitted. For example, if the TB is correctly decoded, an ACK is transmitted. In another example, if the TB cannot be correctly decoded, no HARQ feedback is transmitted.

Optionally, the value "NACK" in the set Z may indicate that HARQ feedback is transmitted only when the result of processing the TB is that a NACK needs to be fed back, otherwise no HARQ feedback is transmitted. For example, if the TB cannot be decoded correctly, a NACK is transmitted. In another example, if the TB is correctly, decoded, no HARQ feedback is transmitted.

Optionally, the value "ACK or NACK" in the set Z may indicate that HARQ feedback is transmitted regardless of whether the result of processing the TB is that an ACK needs to be fed back or a NACK needs to be fed back. For example, if the TB is correctly decoded, an ACK is transmitted. In another example, if the TB cannot be correctly decoded, a NACK is transmitted.

Optionally, when the context is clear, the "feeding back an ACK or a NACK" may be referred to as "feeding back an ACK and a NACK".

Optionally, the "HARQ feedback type" may be determined according to one or a plurality of the following (in any combination of "and" or "or" when applicable):

The "HARQ feedback type" may be indicated in the SCI.

The "HARQ feedback type" may be comprised in the configuration information. For example, it is determined according to the configuration information that all (or none) of SL transmissions require ACK or NACK feedback. In another example, it is determined according to the configuration information that all (or none) of SL transmissions whose cast-type is unicast require ACK or NACK feedback. In another example, it is determined according to the configuration information that all (or none) of SL transmissions whose cast-type is groupcast require ACK or NACK feedback.

The "HARQ feedback type" may be comprised in the pre-configuration information. For example, it is determined according to the pre-configuration information that all (or none) of SL transmissions require ACK or NACK feedback. In another example, it is determined according to the pre-configuration information that all (or none) of SL transmissions whose cast-type is unicast require ACK or NACK feedback. In another example, it is determined according to the pre-configuration information that all (or none) of SL transmissions whose cast-type is groupcast require ACK or NACK feedback.

The value of the "HARQ feedback type" is determined according to the cast-type. For example, if the cast-type is broadcast, the value of the "HARQ feedback type" is always "no HARQ feedback". In another example, if the cast-type is unicast or groupcast, it is determined whether feedback is required according to another condition or a combination of conditions (for example, according to the "HARQ feedback type" in the configuration information or pre-configuration information, in another example, according to whether the resource pool corresponding to the PSCCH and/or the PSSCH and/or the SCI and/or the TB is configured with a HARQ feedback resource, etc.).

The value of the "HARQ feedback type" is determined according to the distance between a transmitting party and a receiving party (for example, geographical distance).

The value of the "HARQ feedback type" is determined according to whether the communication range requirement is met.

The value of the "HARQ feedback type" is determined in other manners.

Optionally, if the cast-type is broadcast, the "HARQ feedback type" does not exist.

In addition, in step S105, the HARQ information is reported. For example, a protocol layer (or protocol sublayer) A of the UE reports the HARQ information to another protocol layer (or protocol sublayer) B.

wherein:

Optionally, the protocol layer (or protocol sublayer) A may be a lower layer of the protocol layer (or protocol sublayer) B, or may be a higher layer (or upper layer) of the protocol layer or protocol sublayer B.

Optionally, any one of the protocol layer (or protocol sublayer) A and the protocol layer (or protocol sublayer) B may be any one of the following (when applicable):

a physical layer (or referred to as a PHY layer, or referred to as a PHY sublayer);

a MAC layer (or referred to as a MAC sublayer);

an RLC layer (or referred to as an RLC sublayer);

a PDCP layer (or referred to as a PDCP sublayer);

a SDAP layer (or referred to as a SDAP sublayer), an RRC layer;

an AS layer;

a NAS layer;

a V2X layer; and an application layer.

Optionally, only part of the HARQ information is reported.

Optionally, in addition to reporting the HARQ information, the SCI and/or the TB are/is also reported.

Optionally, the "reporting" may also be replaced with "indicating" or "delivering".

For example, the physical layer of the UE reports part or all of the HARQ information to the higher layer.

In another example, the physical layer of the UE reports the TB and part or all of the HARQ information associated with the TB to the higher layer.

In another example, the physical layer of the UE reports the SCI, the TB, and part or all of the HARQ information associated with the TB to the higher layer.

In another example, if the SCI indicates that the TB exists, the physical layer of the UE reports the TB and part or all of the HARQ information associated with the TB to the higher layer.

In another example, the physical layer of the UE reports the SCI to the higher layer, where the SCI indicates whether the TB exists; in addition, if the TB exists, the physical layer of the UE reports the TB and part or all of the HARQ information associated with the TB to the higher layer.

In another example, the physical layer of the UE reports the SCI and part or all of the HARQ information associated with the SCI to the higher layer.

Optionally, in Embodiment 1 of the present invention, the SCI may also be referred to as a sidelink grant or a configured sidelink grant.

Optionally, in Embodiment 1 of the present invention, when the SCI is divided into two stages, "the PSCCH" may be replaced with "the first PSCCH".

Optionally, in Embodiment 1 of the present invention, when the SCI is divided into two stages, "the PSCCH" may be replaced with "the second PSCCH".

Optionally, in Embodiment 1 of the present invention, when the SCI is divided into two stages, "the PSCCH" may be replaced with "the first PSCCH and/or the second PSCCH".

Optionally, in Embodiment 1 of the present invention, when the SCI is divided into two stages, "the SCI" may be replaced with "the first-stage SCI".

Optionally, in Embodiment 1 of the present invention, when the SCI is divided into two stages, "the SCI" may be replaced with "the second-stage SCI".

Optionally, in Embodiment 1 of the present invention, when the SCI is divided into two stages, "the SCI" may be replaced with "the first-stage SCI and/or the second-stage SCI".

Optionally, in Embodiment 1 of the present invention, the layer-1 source identifier may also be referred to as a layer-1 source UE identifier (layer-1 source UE ID), or a source identifier (source ID), or a source UE identifier (source UE ID), or a physical layer source identifier (physical layer source ID), or a physical layer source UE identifier (physical layer source UE ID).

Optionally, in Embodiment 1 of the present invention, the layer-1 source identifier may also be referred to as a layer-1 destination UE identifier (layer-1 destination UE ID), or a destination identifier (destination ID), or a destination UE identifier (destination UE ID), or a physical layer destination identifier (physical layer destination ID), or a physical layer destination UE identifier (physical layer destination UE ID).

Optionally, in Embodiment 1 of the present invention, if the cast-type is groupcast, the layer-1 destination ID may also be referred to as a layer-1 destination group identifier (layer-1 destination group ID), or a layer-1 destination UE group identifier (layer-1 destination UE group ID), or a destination group identifier (destination group ID), or a destination UE group identifier (destination UE group ID), or a physical layer destination group identifier (physical layer destination group ID), or a physical layer destination UE group identifier (physical layer destination UE group ID).

Optionally, in Embodiment 1 of the present invention, the HARQ process ID may also be referred to as a HARQ process number.

Optionally, in Embodiment 1 of the present invention, the session identifier (session ID) may also be referred to as a link identifier (link ID).

Optionally, in Embodiment 1 of the present invention, the higher layer may be any one of the following protocol layers or protocol sublayers (when applicable):

a MAC layer (or referred to as a MAC sublayer);

an RLC layer (or referred to as an RLC sublayer);

a PDCP layer (or referred to as a PDCP sublayer);

a SDAP layer (or referred to as a SDAP sublayer);

an RRC layer;

an AS layer;

a NAS layer;

a V2X layer; and an application layer.

Optionally, in Embodiment 1 of the present invention, the configuration information may be comprised in an RRC message or a PC5 RRC message, for example, comprised in an MIB, in another example, comprised in an SIB, in another example, comprised in an SL MIB, in another example, comprised in a PSBCH payload.

Optionally, in Embodiment 1 of the present invention, the configuration information may be comprised in a MAC CE.

Optionally, in Embodiment 1 of the present invention, the pre-configuration information may be comprised in an RRC message or a PC5 RRC message, for example, comprised in an SL-Preconfiguration IE, in another example, comprised in an SL-V2X-Preconfiguration IE.

Optionally, in Embodiment 1 of the present invention, the transmitting party may refer to UE that sends (or transmits) the PSCCH and/or the PSSCH and/or the SCI and/or the TB.

Optionally, in Embodiment 1 of the present invention, the receiving party may refer to the UE (i.e., the UE that executes Embodiment 1 of the present invention).

Optionally, in Embodiment 1 of the present invention, the HARQ information may, also be referred to as SL HARQ information.

Optionally, in Embodiment 1 of the present invention, the NACK may also be referred to as a NAIL.

Optionally, in Embodiment 1 of the present invention, "feedback" may also be referred to as "acknowledgement". For example, "HARQ feedback" may also be referred to as "HARQ acknowledgement".

In this way, in Embodiment 1 of the present invention, by appropriately defining 5G V2X HARQ information, the MAC sublayer of the UE can accurately obtain complete information of a TB related to an HARQ procedure, so as to correctly perform operation(s) related to HARQ.

Embodiment 2

A method performed by user equipment according to Embodiment 2 of the present invention will be described below with reference to FIG. 2.

Figure 2:
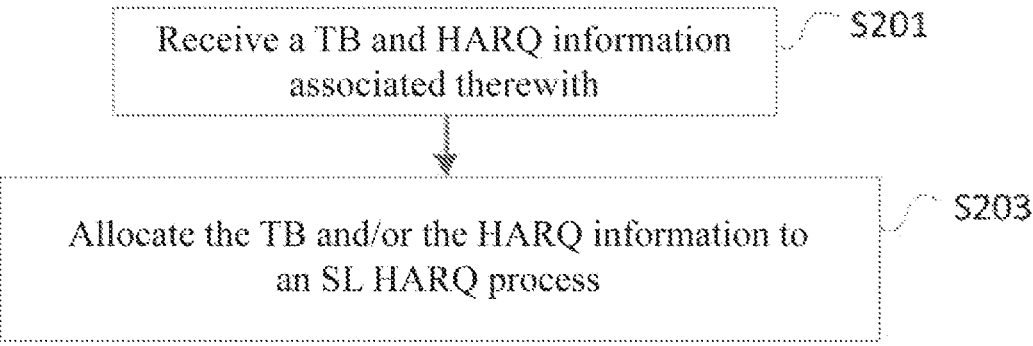
FIG. 2 is a flowchart showing a method performed by user equipment according to Embodiment 2 of the present invention.

FIG. 2 is a flowchart showing a method performed by user equipment according to Embodiment 2 of the present invention.

As shown in FIG. 2, in Embodiment 2 of the present invention, steps performed by the user equipment (UE) include: step S201 and step S203.

Specifically, in step S201, a TB and HARQ information associated therewith are received. For example, a protocol layer (or protocol sublayer) B of the UE receives a TB and HARQ information associated therewith reported by another protocol layer (or protocol sublayer) A.

wherein:

Optionally, the "reporting" may also be replaced with "indicating" or "delivering".

Optionally, characteristics of the content, an indicating method; an associated object, and all other aspects of the HARQ information are exactly the same as corresponding characteristics of the HARQ information in Embodiment 1 of the present invention.

Optionally, the protocol layer (or protocol sublayer) A may be a lower layer of the protocol layer (or protocol sublayer) B, or may be a higher layer of the protocol layer or protocol sublayer B.

Optionally, any one of the protocol layer (or protocol sublayer) A and the protocol layer (or protocol sublayer) B may be any one of the following (when applicable):

a physical layer (or referred to as a PHY layer, or referred to as a PHY sublayer);

a MAC layer (or referred to as a MAC sublayer);

an RLC layer (or referred to as an RLC sublayer);

a PDCP layer (or referred to as a PDCP sublayer);

a SDAP layer (or referred to as a SDAP sublayer);

an RRC layer;

an AS layer;

a NAS layer;

a V2X layer; and an application layer.

For example, the protocol layer (or protocol sublayer) A is the physical layer; and the protocol layer (or protocol sublayer) B is the MAC layer (or referred to as the MAC sublayer).

Optionally, only part of the HARQ information is received.

Optionally, additionally, SCI for scheduling the TB is further received.

For example, the MAC layer (or referred to as the MAC sublayer) of the UE receives a TB and HARQ information associated therewith from the physical layer.

In addition, in step S203, the TB and/or the HARQ information are allocated to an SL HARQ process (sidelink HARQ process).

wherein:

Optionally, additionally, the SL HARQ process is associated with the SCI.

Optionally, the SL HARQ process is maintained by an SL HARQ entity (sidelink HARQ entity). wherein:

Optionally, for each SL carrier, there is one SL HARQ entity.

Optionally, the SL HARQ entity maintains one or a plurality of SL HARQ processes.

Optionally, the SL HARQ entity is located in a MAC entity of the UE,

Optionally, when the context is clear, the SL HARQ entity is also referred to as a HARQ entity.

Optionally, an SL HARQ process to be allocated to is determined according to one or a plurality of items in the HARQ information described in Embodiment 1 and/or other information.

For example, there may be a unique broadcast-related SL HARQ process (for example, referred to as an SL broadcast HARQ process) in the SL HARQ entity. In this case, if a cast-type in the HARQ information is broadcast, the SL HARQ process to be allocated is determined as the SL broadcast HARQ process.

In another example, if the cast-type in the HARQ information is broadcast, an SL HARQ process is determined according to a layer-1 source identifier in the HARQ information.

In another example, if the cast-type in the HARQ information is broadcast, an SL HARQ process is determined according to the layer-1 source identifier and a HARQ process identifier in the HARQ information.

In another example, if the cast-type in the HARQ information is unicast, an SL HARQ process is determined according to the layer-1 source identifier, a layer-1 destination identifier, and the HARQ process identifier in the HARQ information.

In another example, if the cast-type in the HARQ information is groupcast, an SL HARQ process is determined according to the layer-1 source identifier, a layer-1 destination identifier, and the HARQ process identifier in the HARQ information.

Optionally, in Embodiment 2 of the present invention, the SL HARQ process is also referred to as a HARQ process when the context is clear.

Optionally, in Embodiment 2 of the present invention, the SL HARQ process is also referred to as an SL process when the context is clear.

In this way, in Embodiment 2 of the present invention, received TBs are allocated to different SL HARQ processes according to the cast-type and each identifier in the HARQ information, ensuring that a plurality of transmissions of one TB can be effectively combined in the case where the physical layer of the UE supports blind retransmission and/or HARQ retransmission and/or multiple source/destination identifiers and/or multiple cast-types, ensuring the performance of HARQ combining.

Embodiment 3

A method performed by user equipment according to Embodiment 3 of the present invention will be described below with reference to FIG. 3.

Figures 3, 4:
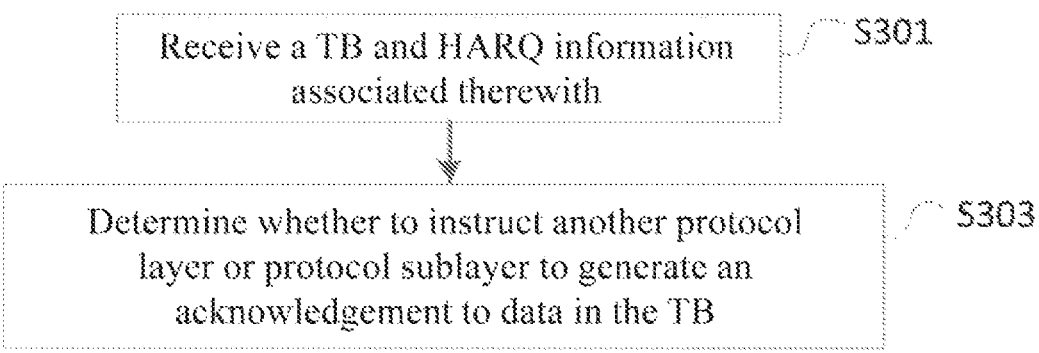
FIG. 3 is a flowchart showing a method performed by user equipment according to Embodiment 3 of the present invention.
FIG. 4 is a block diagram schematically showing user equipment according to the present invention.

FIG. 3 is a flowchart showing a method performed by user equipment according to Embodiment 3 of the present invention.

As shown in FIG. 3, in Embodiment 3 of the present invention, steps performed by the user equipment (UE) include: step S301 and step S303.

Specifically, in step S301, a TB and HARQ information associated therewith are received. For example, a protocol layer (or protocol sublayer) B of the UE receives a TB and HARQ information associated therewith reported by another protocol layer (or protocol sublayer) A.

wherein:

Optionally, the "reporting" may also be replaced with "indicating" or "delivering".

Optionally, characteristics of the content, an indicating method, an associated object, and all other aspects of the HARQ information are exactly the same as corresponding characteristics of the HARQ information in Embodiment 1 of the present invention.

Optionally, the protocol layer (or protocol sublayer) A may be a lower layer of the protocol layer (or protocol sublayer) B, or may be a higher layer of the protocol layer or protocol sublayer B.

Optionally, only part of the HARQ information is received.

For example, the MAC layer (or referred to as the MAC sublayer) of the UE receives a TB and HARQ information associated therewith from the physical layer.

In addition, in step S303, it is determined whether to instruct a protocol layer (or protocol sublayer) C to generate an acknowledgement to data in the TB.

wherein:

Optionally, the "acknowledgement to the data in the TB" may also be referred to as an "acknowledgement to the TB".

Optionally, the acknowledgement may include a positive acknowledgement.

Optionally, the acknowledgement may include a negative acknowledgement.

For example, if a "no acknowledgement" condition is met, the protocol layer (or protocol sublayer) C is not instructed to generate an acknowledgement to the data in the TB. In another example, if the "no acknowledgement" condition is not met, the protocol layer (or protocol sublayer) C is instructed to generate an acknowledgement to the data in the TB. The "no acknowledgement" condition may include one or a plurality of the following (in any combination of "and" or "or" when applicable):

a cast-type in the HARQ information is broadcast;

the value of "whether HARQ feedback is required" in the HARQ information is "no"; and a "HARQ feedback type" in the HARQ information is "none".

Optionally, in Embodiment 3 of the present invention, any one of the protocol layer (or protocol sublayer) A, the protocol layer (or protocol sublayer) B, and the protocol layer (or protocol sublayer) C may be any of the following (when applicable):

a physical layer (or referred to as a PHY layer, or referred to as a PHY sublayer a MAC layer (or referred to as a MAC sublayer);

an RLC layer (or referred to as an RLC sublayer);

a PDCP layer (or referred to as a PDCP sublayer);

a SDAP layer (or referred to as a SDAP sublayer);

an RRC layer;

an AS layer;

a NAS layer;

a V2X layer; and an application layer.

For example; the protocol layer (or protocol sublayer) A is the physical layer, the protocol layer (or protocol sublayer) B is the MAC layer (or referred to as the MAC sublayer), and the protocol layer (or protocol sublayer) C is the physical layer.

In this way, in Embodiment 3 of the present invention, according to a cast-type and other information related to HARQ acknowledgement in the HARQ information, it is determined whether to instruct the physical layer to generate an acknowledgement to the received TB, ensuring that the HARQ procedure of the UE supports both HARQ feedback-based transmission and HARQ feedback-free transmission.

VARIATION EMBODIMENT

Hereinafter, FIG. 4 is used to illustrate user equipment that can perform the method performed by user equipment described in detail above in the present invention as a variant embodiment.

FIG. 4 is a block diagram showing the user equipment (UE) involved in the present invention.

As shown in FIG. 4, the user equipment (UE) 40 includes a processor 401 and a memory 402. The processor 401 may include, for example, a microprocessor, a microcontroller, an embedded processor, and the like. The memory 402 may include, for example, a volatile memory (such as a random access memory (RAM)), a hard disk drive (HDD), a non-volatile memory (such as a flash memory), or other memories. The memory 402 stores program instructions. The instructions, when run by the processor 401, can perform the foregoing method performed by user equipment as described in detail in the present invention.

The methods and related equipment according to the present invention have been described above in combination with preferred embodiments. It should be understood by those skilled in the art that the methods shown above are only exemplary, and the above embodiments can be combined with one another as long as no contradiction arises. The methods of the present invention are not limited to the steps or sequences illustrated above. The network node and user equipment illustrated above may include more modules. For example, the network node and user equipment may further include modules that can be developed or will be developed in the future to be applied to a base station, an MME, or UE, and the like. Various identifiers shown above are only exemplary, and are not meant for limiting the present invention. The present invention is not limited to specific information elements serving as examples of these identifiers. Those skilled in the art can make various alterations and modifications according to the teachings of the illustrated embodiments.

It should be understood that the above-described embodiments of the present invention may be implemented by software, hardware, or a combination of software and hardware. For example, various components inside the base station and the user equipment in the above embodiments may be implemented through various devices, which include, but are not limited to, analog circuit devices, digital circuit devices, digital signal processing (DSP) circuits, programmable processors, application specific integrated circuits (ASICs), field programmable gate arrays (FPGAs), programmable logic devices (CPLDs), and the like.

In this application, the term "base station" may refer to a mobile communication data and control switching center having specific transmission power and a specific coverage area and including functions such as resource allocation and scheduling, data reception and transmission, and the like. "User equipment" may refer to a user mobile terminal, for example, including terminal devices that can communicate with a base station or a micro base station wirelessly, such as a mobile phone, a laptop computer, and the like.

In addition, the embodiments of the present invention disclosed herein may be implemented on a computer program product. More specifically, the computer program product is a product provided with a computer-readable medium having computer program logic encoded thereon. When executed on a computing device, the computer program logic provides related operations to implement the above technical solutions of the present invention. When executed on at least one processor of a computing system, the computer program logic causes the processor to perform the operations (methods) described in the embodiments of the present invention. Such setting of the present invention is typically provided as software, codes and/or other data structures provided or encoded on the computer readable medium, e.g., an optical medium (e.g., compact disc read-only memory (CD-ROM)), a flexible disk or a hard disk and the like, or other media such as firmware or micro codes on one or more read-only memory (ROM) or random access memory (RAM) or programmable read-only memory (PROM) chips, or a downloadable software image, a shared database and the like in one or more modules. Software or firmware or such configuration may be installed on a computing device such that one or more processors in the computing device perform the technical solutions described in the embodiments of the present invention.

In addition, each functional module or each feature of the base station device and the terminal device used in each of the above embodiments may be implemented or executed by a circuit, which is usually one or more integrated circuits. Circuits designed to execute various functions described in this description may include general-purpose processors, digital signal processors (DSPs), application specific integrated circuits (ASICs) or general-purpose integrated circuits, field programmable gate arrays (FPGAs) or other programmable logic devices, discrete gates or transistor logic, or discrete hardware components, or any combination of the above. The general purpose processor may be a microprocessor, or the processor may be an existing processor, a controller, a microcontroller, or a state machine. The aforementioned general purpose processor or each circuit may be configured by a digital circuit or may be configured by a logic circuit. Furthermore, when advanced technology capable of replacing current integrated circuits emerges due to advances in semiconductor technology, the present invention can also use integrated circuits obtained using this advanced technology.

While the present invention has been illustrated in combination with the preferred embodiments of the present invention, it will be understood by those skilled in the art that various modifications, substitutions, and alterations may be made to the present invention without departing from the spirit and scope of the present invention. Therefore, the present invention should not be limited by the above-described embodiments, but should be defined by the appended claims and their equivalents.

The invention claimed is:

1. A method for new radio (NR) sidelink communications performed by a user equipment (UE), the method comprising:

receiving Sidelink Control Information (SCI);

receiving a Transport Block (TB) associated with the SCI from a physical layer; and allocating the TB to a Sidelink process based on a cast-type, a Layer-1 Source Identifier (ID), and a Layer-1 Destination ID in the SCI, wherein the Sidelink process is one of a plurality of Sidelink processes maintained by a sidelink Hybrid Automatic Repeat Request (HARQ) entity located in a Medium Access Control (MAC) entity of the UE.

2. The method according to claim 1, wherein:

the allocating is further based on a New Data Indicator (NDI) in the SCI.

3. A user equipment (UE) which performs new radio (NR) sidelink communications, the UE comprising:

at least one processor; and at least one non-transitory computer-readable medium coupled to the at least one processor and storing one or more computer executable instructions that, when executed by the at least one processor, cause the UE to:

receive Sidelink control information (SCI);

receive a Transport Block (TB) associated with the SCI from a physical layer; and allocate the TB to a Sidelink process based on a cast-type, a Layer-1 Source Identifier (ID), and a Layer-1 Destination ID in the SCI, wherein the Sidelink process is one of a plurality of Sidelink processes maintained by a sidelink Hybrid Automatic Repeat Request (HARQ) entity located in a Medium Access Control (MAC) entity of the UE.

4. The UE according to claim 3, wherein:

the allocation of the TB to the Sidelink process is further based on a New Data Indicator (NDI) in the SCI.

* * * * *